United States Patent Office 3,048,374
Patented Aug. 7, 1962

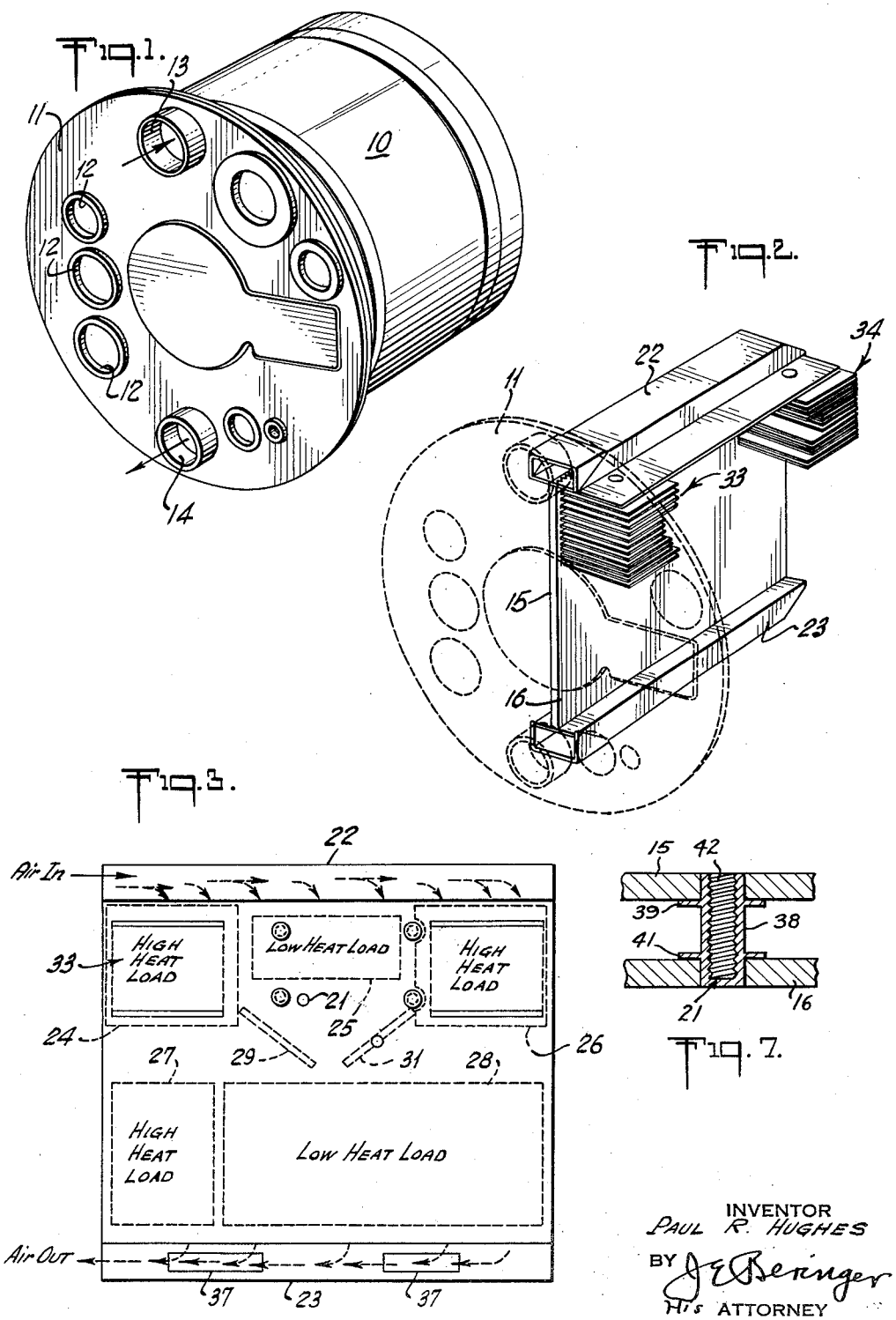

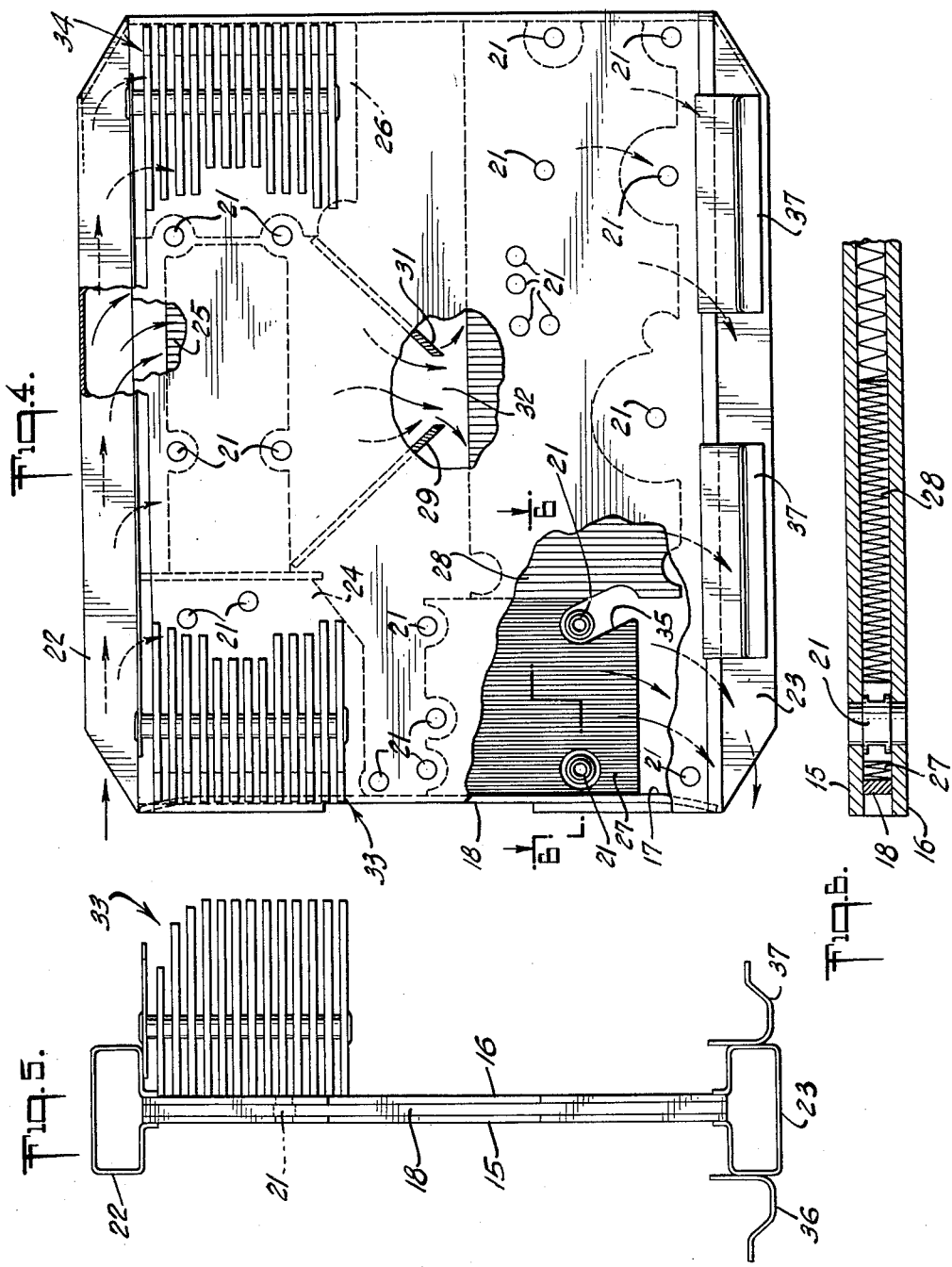

3,048,374
COOLED MOUNTING PLATE FOR ELECTRONIC EQUIPMENT
Paul R. Hughes, Englewood, Ohio, assignor to United Aircraft Products, Inc., Dayton, Ohio, a corporation of Ohio
Filed Nov. 10, 1958, Ser. No. 772,768
3 Claims. (Cl. 257—256)

This invention relates to cooled plate mounts for electronic equipment, adapted to dissipate generated heat.

An object of the invention is to present a mounting plate construction in which the component parts are brazed or otherwise united to an integrated form and which provides a fluid flowing circuit for the absorption and carrying off of generated heat.

Another object of the invention is to utilize a unique means of mounting the electronic or like equipment upon the plate for maximum heat transfer effect.

Other objects and structural details of the invention will appear from the following description when read in connection with the accompanying drawings, wherein:

FIG. 1 is a view in perspective of an electronic equipment package utilizing a mounting plate in accordance with the illustrated embodiment of the invention;

FIG. 2 is a view similar to FIG. 1 showing the mounting plate structure in connection with a superposed bulkhead forming a part of the equipment package;

FIG. 3 is a diagrammatic view of the mounting plate and a fin arrangement therein obtaining differential heat transmission;

FIG. 4 is a view similar to FIG. 3, but in structural terms;

FIG. 5 is an end view of the plate of FIG. 4;

FIG. 6 is a fragmentary view in cross-section taken substantially along the line 6—6 of FIG. 4; and FIG. 7 is a fragmentary enlarged view in section of a button or stud interconnecting elements of the mounting plate and directly mounting the electronic or like equipment.

Referring to the drawings, in its illustrative embodiment the invention is a part of an electronic package including a cylindrical case 10 closed at one end and open at the other to receive the mounted assembly of electronic components, the inserted assembly including an end bulkhead 11. A sealed connection is effected between the case 10 and bulkhead 11 in a manner to close the interior of the case from outside communication. The pressure within the case accordingly can be maintained at any desired level against rising and falling exterior pressures. The bulkhead 11 is formed with a variety of access holes 12 for the making of electrical connections, and further with diametrically opposed openings 13 and 14 for connection in a system circulating a fluid coolant.

The mounting plate of the illustrated embodiment of the invention is a unitary sub-assembly which is welded or otherwise secured to the bulkhead 11 to project from the inner face thereof in the manner indicated in FIG. 2. Comprised in the sub-assembly is a pair of aligned, spaced apart flat metal plates 15 and 16 of rectangular configuration. The plates define therebetween a space 17 which is open at its upper and lower marginal edges (as viewed in FIGS. 4 and 5) and closed at its front and back marginal edges by inserted nose pieces 18 and 19. Installed in and assisting in holding the plates 15 and 16 in aligned spaced relation are buttons 21 which extend transversely through the space 17 and relatively small diameter portions received in openings of corresponding size in the respective plates, the opposite ends of the buttons terminating substantially in the planes of the outer surfaces of the plates. The buttons 21 serve also as mounts for pieces of electronic equipment and so are variously distributed over the surface of the plate assembly. Further in accordance with the present invention, the buttons 21 are selectively drilled through or tapped to enable a flush mounting of the electronic equipment with the plate as represented by the upper one of the plates 15 or 16. In this connection, it will be understood that the plate assembly as described provides a mounting base for the electronic equipment and one or both sides thereof will in the use of the plate directly receive the installed equipment.

The upper and lower marginal edges of the space 17 are closed by respective manifolds 22 and 23 which are directly supported on opposed longitudinal edges of the plate assembly in the manner shown in FIG. 5. The manifolds are closed at their one ends and are correspondingly arranged so that the opposite or open ends thereof communicate with respective fluid connections 13 and 14 in the bulkhead 11. According to the construction and arrangement of parts, the connection 13 serves as the fluid inlet while the connection 14 serves as a fluid outlet. Thus, a fluid is directed under pressure to inlet 13. Passing through the bulkhead, it is admitted to manifold 22 of the cold plate assembly within case 10. There it collects and descends through the space 17 between the plates 15 and 16. Flowing in this manner to lower manifold 23, the fluid leaves the cooling package by way of outlet 14. Flow of the fluid through the space 17, it will be understood, cools the plates 15 and 16, with a consequent absorption or dissipation of the heat generated by the electronic equipment. The buttons 21, it may be noted, are directly interposed in the path of the flowing fluid and tend to conduct heat directly from the source to the flowing fluid.

A fin material is arranged in the space 17 to provide extended heat transfer surface. The fin material is in the form of strips of a corrugated metallic foil-like material, and, as a simplified means of putting into effect a concept of variable fin density, is here used in a number of individual strips 24–28. Thus, as indicated in a comparison of strips 27 and 28 the folds thereof occur in differential numbers per inch of length with the result that the flow passages defined therethrough for the coolant are restricted to greater and lesser extent, and the amount of surface area is correspondingly greater and lesser. As indicated also in FIG. 6, a single strip may be formed to present fin area of different density along its own length, the strip 28 being so formed. The selection of the fin density and the arrangement of the fin material in the space 17 is in this instance determined by the characteristics of the heat load. Thus, where on account of the arrangement of the electronic equipment the generated heat load is the greatest, then the fin material is at that point constructed and arranged for a maximum heat pick-up. Similarly, the invention has in view restricting fluid flow through the space 17 in a variable manner in accordance with the characteristics of the heat load. In the illustrated instance, two baffles 29 and 31 are arranged in approximately the middle of the space 17 and incline toward one another to define a restricted opening 33. The incoming fluid from manifold 22 accordingly is compelled in large part to follow a path downward along the sides of the space 17, these areas being in the present instance the ones in which the heat generated is the greatest. In this regard, in the illustrated form of the invention additional heat transfer surface in the side areas of the plate is obtained by mounting on the exterior of the plate 16 assemblies 33 and 34 of external fins. An electronic package as disclosed may include an interior fan blowing air within the case over the electronic equipment and over the fin assemblies 33 and 34 which assist in conducting the heat in the moving air to the plate.

Where necessary, as in the case of fin strip 27, the fin material is formed with slots or openings 35 to allow passage of the buttons 21 therethrough. According to a further feature of the invention, these slots or openings are constructed to leave an annular space around the buttons in such manner that the flowing air in space 17 may make direct contact with the buttons and flow around them.

The entire assembly comprising the plates 15 and 16, nose pieces 18 and 19, buttons 21, fin strips 24–28, baffles 29 and 31 manifolds 22 and 23, and fin assemblies 33 and 34, all are preliminarily assembled, and while suitably fixtured, are united into a single assembly, as by process of dip brazing. This assembly, which in greater or lesser part constitutes the mounting plate assembly, is then welded or otherwise attached to the main bulkhead 11 and in a similar manner attached to opposite strengthening webs or bulkheads if any. Equipment supporting brackets 36 and 37 similarly may be welded to the plate assembly. The augmented assembly then is ready for installation of the electronic equipment, and the whole of the device is completed by being installed and sealed in the case 10.

FIG. 3 shows in diagrammatic form the arrangement of the fins several internal and external fins to correspond with the areas of high and low heat load. The references to high and low heat load have, as noted, application to conditions of generated heat as determined by the kind and wattage of the electronic equipment mounted upon the mounting plate, and the location thereof.

The mounting plate has its strength and its resistance to shear and separation stresses greatly increased by the buttons 21. Each of these, moreover, is formed with an annular groove 38 providing free flow area around the button without loss of contact with the plates for effective brazing. Thus, as noted in FIG. 7, a representative button 21 is in effect formed with spaced apart flanges 39 and 41 in contact respectively with the plates 15 and 16 while the groove 38 defines open flow area close to the tapped interior 42 of the button.

What is claimed is:

1. A plate to mount electronic and like equipment, including a pair of heat conductiing plate elements in parallel spaced apart relation, the space between said plate elements being open at certain marginal edges for flow of a fluid through said space, nose pieces closing the other marginal edges of said space, fin material arranged in said space to provide extended heat transfer surface, buttons mounted in and holding said plate elements in aligned spaced apart relation, said buttons being internally threaded and opening from their interior through one plate element to serve as mounts for the electronic and like equipment and the fin material being constructed and arranged in spaced relation to said buttons to permit lateral passage of the buttons through the fin material without obstructing fluid flow around the buttons at the locations thereof, said buttons further being formed intermediate said plate elements with spaced apart flanged contracting respective plate elements and made thin to expose the major part of the button intermediate the plate elements to contact with the flowing fluid, said flanges being wide in relation to the wall thickness of the button intermediate said plate elements, and manifolds mounted on the plate elements in enclosing relation to said certain marginal edges, said manifolds having respective fluid inlet and outlet openings, the assembly comprising said plate elements, said fin material, said buttons, said nose pieces and said manifolds being joined in a unitary assembly.

2. A plate according to claim 1, characterized by external fins on said plate elements at selection locations in correspondence with more intense heat loads upon the cold plate.

3. A plate to mount electronic and like equipment, including a pair of heat conducting plate elements in parallel spaced apart relation and serving as a duct for flowing fluid therebetween, said plates having a plurality of aligned openings, a button installed in each pair of aligned openings having ends to fit closely in respective openings in non-projecting relation to outer surfaces of said plates, said button having a bore opening through one end thereof and through the plate receiving said one end, said bore extending through the intermediate portion of the button or that portion intermediate said plates and defining relatively thin walls in such portion, said intermediate portion of the button being formed with spaced apart radial flanges for contact with respective inner plate surfaces, said flanges being made thin to expose a major part of the intermediate portion of the button to contact with the flowing fluid, and means providing extended heat transfer surface intermediate said plates and around said buttons, said means including fin strips having openings to pass said buttons therethrough, said openings providing for a spaced relation of said fin strips and said buttons.

References Cited in the file of this patent

UNITED STATES PATENTS

| | | |
|---|---|---|
| 2,045,659 | Lindenblad | June 30, 1936 |
| 2,280,133 | Sunbach | Apr. 21, 1942 |
| 2,573,538 | Brown | Oct. 30, 1951 |
| 2,890,863 | Scal | June 16, 1959 |

FOREIGN PATENTS

| | | |
|---|---|---|
| 17,978 | Great Britain | Sept. 9, 1901 |